(12) United States Patent
Prust et al.

(10) Patent No.: US 8,839,498 B2
(45) Date of Patent: Sep. 23, 2014

(54) MACHINE TOOL, PARTICULARLY FOR MILLING A TURBOCHARGER COMPRESSOR IMPELLER

(75) Inventors: Dirk Prust, Tuttlingen (DE); Karl Deufel, Kolbingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 12/857,438

(22) Filed: Aug. 16, 2010

(65) Prior Publication Data

US 2011/0067240 A1  Mar. 24, 2011

Related U.S. Application Data (63) Continuation of application No. PCT/EP2009/001229, filed on Feb. 20, 2009.

(30) Foreign Application Priority Data

Feb. 29, 2008 (DE) .......................... 10 2008 013 716

(51) Int. Cl.
*B23P 23/02* (2006.01)
*B23C 3/18* (2006.01)
(Continued)

(52) U.S. Cl.
CPC . *B23P 13/00* (2013.01); *B23B 5/00* (2013.01); *F05B 2230/10* (2013.01); *B23C 3/18* (2013.01); *B23P 23/02* (2013.01); *B23Q 3/069* (2013.01); *B23Q 3/04* (2013.01); *B23Q 3/063* (2013.01); *B23B 3/12* (2013.01); *B23B 23/04* (2013.01); *B23Q 3/183* (2013.01)
USPC ............... 29/27 C; 409/168; 409/224; 269/51

(58) Field of Classification Search
CPC ......... B23C 3/18; B23C 3/16; F05B 2230/10; B23Q 3/063; B23Q 3/069; B23Q 3/04
USPC ........ 29/27 C, 27 R; 409/168, 165, 198–199, 409/224, 221; 269/50, 51, 52; 82/122
See application file for complete search history.

(56) References Cited

U.S. PATENT DOCUMENTS 2,909,966 A   10/1959  Barens
(Continued)

FOREIGN PATENT DOCUMENTS

DE   83 01 187   9/1984
DE   35 28 402   2/1986
(Continued)

OTHER PUBLICATIONS

International Search Report for PCT/EP2009/001229, mailed on Oct. 8, 2009, 2 pages.
(Continued)

*Primary Examiner* — Erica E Cadugan
(74) *Attorney, Agent, or Firm* — Harness, Dickey & Pierce, P.L.C.

(57) ABSTRACT

The present invention relates to a machine tool and a corresponding method for machining, in particular for turning and milling, a workpiece having a central bore, said machine tool including a tool holder for holding a tool, a work rest for seating the workpiece, a work mounting for holding the workpiece in place, and a drive mechanism for rotating the workpiece about a central rotation axis, wherein the work rest has an arbor for attaching the workpiece, such that a section of the arbor projects into the central bore on a first side of the workpiece, and wherein the work mounting has a counterholder movable in the direction of the bore axis of the central bore for applying a contact pressure, acting in the direction of the bore axis, to the workpiece on a second side opposite the first side.

20 Claims, 5 Drawing Sheets

(51) Int. Cl.
*B23C 1/14* (2006.01)
*B23Q 1/25* (2006.01)
*B23Q 3/04* (2006.01)
*B23Q 3/06* (2006.01)
*B23P 13/00* (2006.01)
*B23B 5/00* (2006.01)
*B23B 3/12* (2006.01)
*B23B 23/04* (2006.01)
*B23Q 3/18* (2006.01)

(56) References Cited

U.S. PATENT DOCUMENTS

| | | | |
|---|---|---|---|
| 4,682,445 A | | 7/1987 | Ono |
| 5,212,857 A | * | 5/1993 | McMurtry ............ 409/221 |
| 5,531,633 A | | 7/1996 | Riley et al. |
| 5,678,291 A | * | 10/1997 | Braun ............ 409/168 |
| 6,983,527 B2 | * | 1/2006 | Lanvin ............ 409/221 |
| 7,491,022 B2 | * | 2/2009 | Kato et al. ............ 409/221 |
| 2004/0049902 A1 | * | 3/2004 | Hagstrom ............ 29/26 A |
| 2005/0023778 A1 | | 2/2005 | Louthan et al. |
| 2006/0137169 A1 | * | 6/2006 | Boehm et al. ............ 29/27 C |

FOREIGN PATENT DOCUMENTS

| | | |
|---|---|---|
| DE | 299 03 418 | 6/1999 |
| DE | 20 2007 004 553 | 9/2008 |
| EP | 1 033 196 | 9/2000 |
| EP | 1 445 056 | 8/2004 |
| EP | 1 523 396 | 2/2008 |
| JP | 58-89222 | 6/1983 |
| JP | 1-60839 | 4/1989 |
| JP | 3-55133 | 5/1991 |
| JP | 03-202244 | 9/1991 |
| JP | 2001-198754 | 7/2001 |
| SU | 1053982 A * | 11/1983 |
| WO | WO-2009/106268 A2 * | 9/2009 |

OTHER PUBLICATIONS

Notice of Reasons for Rejection (translation) for JP 2010-548004, mailed May 7, 2013, 4 pages.

* cited by examiner

MACHINE TOOL, PARTICULARLY FOR MILLING A TURBOCHARGER COMPRESSOR IMPELLER

CROSS-REFERENCE TO RELATED APPLICATIONS

This is a continuation application of International patent application PCT/EP2009/001229, filed on 20 Feb. 2009, designating the United States and published as WO 2009/106268 A2, which claims priority to German application No. 10 2008 013 716.2, filed on 29 Feb. 2008. The entire contents of these prior applications are incorporated herein by this reference.

BACKGROUND OF THE INVENTION

1. Field of the Invention

The present invention relates to a machine tool for machining, in particular for turning and milling, a workpiece having a central bore, comprising a tool holder for holding a tool, a work rest for seating the workpiece, a work mounting for holding the workpiece in place and a drive means for rotating the workpiece about a central rotation axis.

In addition, the invention also relates to a further machine tool for machining, in particular for turning and milling, a workpiece having a central rotation axis, comprising a tool holder for holding a tool, a work rest for seating the workpiece, a work mounting for holding the workpiece in place and a drive means for rotating the workpiece about the rotation axis.

Furthermore, the invention relates to corresponding methods for machining, in particular for turning and milling, a workpiece.

The invention relates in particular to a machine tool and a corresponding method for machining workpieces which, when used as intended, are operated at high rotational speeds and which in particular require milling and turning, such as, for example, a turbocharger compressor impeller.

2. Related Prior Art

In a machine tool known to the applicant for machining a turbocharger compressor impeller, a workpiece blank, the outer contours of which are pre-machined, in particular rough-turned, is put onto a work rest. In this case, the bearing surface of this work rest is adapted to the outer contour, resting thereon, of the compressor impeller, such that the underside of the compressor impeller rests on the work rest as fully as possible. To fix the compressor impeller, a screw is passed through a central bore in the compressor impeller, a nut being screwed onto the top end of said screw, as a result of which the compressor impeller is pressed downward toward the work rest and held in place. After that, the workpiece is machined. In the case of a turbocharger compressor impeller the machining mainly involves milling, by means of which the relatively complex outer surfaces are incorporated in the workpiece blank.

Since such a turbocharger compressor impeller is machined at extremely high rotational speeds (up to 200,000 rev/min), it is necessary for the workpiece blank to be arranged as centrally as possible for the machining, that is to say as concentrically as possible to the machining rotation axis about which the workpiece is rotated during the machining. In the case of workpiece blanks having a pre-machined central bore which defines the axis of rotation during the subsequent operation of the workpiece, it is especially necessary for the machining to be carried out centrally to the central bore. In the known machine tool, however, no adequate precision with regard to the central arrangement of the workpiece or of the central bore thereof can be achieved before and during the machining, for which reason it is absolutely necessary for the workpiece to be re-balanced after the machining in order to remove existing unbalance. For such re-balancing, the workpiece has to be clamped in place again in another fixture, a factor which is time-consuming and once again constitutes a source for inaccuracies.

SUMMARY OF THE INVENTION

Against this background, the object of the present invention is to specify a machine tool and a corresponding method for machining a workpiece, with which in particular workpieces which are intended for operation at very high rotational speeds can be machined with high precision so that balancing after the machining can be completely dispensed with as far as possible.

The above object is achieved by a machine tool for machining, in particular for turning and milling, a workpiece having a central bore, said machine tool comprising a tool holder for holding a tool, a work rest for seating the workpiece, a work mounting for holding the workpiece in place, and a drive means for rotating the workpiece about a central rotation axis, wherein the work rest has an arbor for attaching the workpiece, such that a section of the arbor projects into the central bore on a first side of the workpiece, and wherein the work mounting has a counter-holder movable in the direction of the bore axis of the central bore for applying a contact pressure, acting in the direction of the bore axis, to the workpiece on a second side opposite the first side.

Furthermore, the above object is achieved by a corresponding method for machining, in particular for turning and milling, a workpiece having a central bore, said method comprising the steps of holding the tool by a tool holder, placing the workpiece on a work rest, holding the workpiece in place by a work mounting, and rotating the workpiece about a central rotation axis by a drive means, wherein the workpiece is attached to an arbor, such that a section of the arbor projects into the central bore on a first side of the workpiece, and wherein a contact pressure acting in the direction of the bore axis is applied to the workpiece in the direction of the bore axis of the central bore on a second side opposite the first side in order to hold the workpiece in place.

The invention is based on the recognition that, although the workpiece can be adequately held in place by means of screw and nut in the known machine tool, the centered arrangement, despite the work rest with a contour adapted to the underside of the workpiece, is not possible with sufficient accuracy since neither this work rest nor this type of work mounting brings the workpiece itself into the central position in a highly precise manner.

This is now possible in a surprising manner in the machine tool according to the invention. This is because the arbor of the work rest has, at least partly in one section, an oversize compared with the diameter of the bore of the workpiece, with the result that the workpiece is centered virtually automatically when being attached to the arbor. The arbor can be, for example, a tapered arbor having a tapered section which projects partly into the bore of the workpiece. Alternatively, the arbor can also be realized by a short cylinder having an insertion bevel or chamfer. In principle, all components which ensure a positive-locking centered seat when attaching the workpiece to the arbor are suitable as an arbor.

This centering is also further assisted by virtue of the fact that a contact pressure is applied to the workpiece from above by means of a work mounting in order to hold the workpiece in place, said contact pressure acting precisely in the direction of the bore axis. As a result, the workpiece is centrally clamped in place with very high precision and is held in place in a rotatable manner about the central bore axis between the work mounting, acting as a type of tailstock, and the work rest. The bore axis and the workpiece rotation axis therefore coincide with high accuracy, and the workpiece is arranged for machining concentrically to the workpiece rotation axis.

Consequently, the workpiece can be machined with high precision in the machine tool according to the invention and the method according to the invention. Furthermore, finish-turning of the outer contour, for example, is possible after the actual machining (e.g., the actual milling) in the same setup of the workpiece with the same machine tool, and in particular subsequent, time-consuming balancing of the workpiece by means of another machine and/or in another setup is no longer necessary. The workpieces can therefore be produced more quickly overall and thus also in a more cost-effective manner.

In a preferred configuration, the counter-holder has an arbor for inserting into the bore on the second side of the workpiece, such that a tapered section of the arbor projects into the central bore on the second side of the workpiece. Furthermore, in addition to enabling the workpiece to be simply fastened in place in this way, this arbor also helps to center the workpiece if in particular a section of the arbor has an oversize relative to the diameter of the bore of the workpiece. This arbor of the counter-holder can in principle be configured and realized in the same way as the arbor of the work rest, although this need not necessarily be the case.

In a further configuration, the work mounting is designed for pivoting the counter-holder in a pivoting plane perpendicular to the bore axis. As a result, the counter-holder can be swung away from the workpiece so that workpieces can be loaded into and unloaded from the machine tool in a fully automatic manner.

Furthermore, it is preferred that the work rest has a work rest surface for seating the workpiece, said work rest surface being configured in such a way that the workpiece, in the state in which it is attached to the arbor and a contact pressure is applied to it by the counter-holder, rests only in its marginal region on the work rest surface. The workpiece therefore does not rest with its entire underside on a correspondingly adapted work rest surface, as in the known fixture, but rather preferably only in its marginal region.

This is because the inventors have found that defined seating of the workpiece is achieved by the workpiece resting only in this region, this defined seating producing optimal frictional (torque) clamping against rotation by machining forces on account of the maximum lever effect.

The workpieces intended for machining with the machine tool according to the invention usually have a centrally running bore axis, the bore usually being a through-bore (but not necessarily) from the first side to the second side of the workpiece. In particular for machining workpieces configured in this way, it is preferred that the rotation axis, about which the workpiece is rotated for machining in the machine tool, and the bore axis coincide. In this configuration, the work rest has only a single arbor, which engages in the bore from the first side. Instead of a central bore, other workpieces have a central collar, e.g., a central cylinder or taper.

Alternatively, however, the workpiece can have, on the first and/or the second side, more than one through-bores or blind-hole-like bores, for example three of such bores, and the work rest and/or the counter-holder can have a corresponding number of arbors for inserting into the corresponding bores. In this configuration, the rotation axis and the bore axes do not coincide but rather run parallel to one another. Otherwise, however, a highly precise central position of the workpiece is achieved in this configuration too.

In a further preferred configuration, the machine tool is configured for milling the outer surfaces of a turbocharger compressor impeller. With the machine tool according to the invention, in particular a plurality of machining operations can be carried out in the same setup of the tool, a factor which is time-saving and promotes precision, since the workpiece does not have to be re-clamped.

Furthermore, in a preferred configuration of the method according to the invention, the outer surfaces of the workpiece are machined by means of turning, boring and/or milling in a first machining step, and the outer contour of the workpiece is finish-turned in a second machining step. Such a method is used in particular in the machining of a turbocharger compressor impeller.

Furthermore, it is preferred that the machine tool has a transverse axis which runs transversely to the rotation axis and about which the workpiece can be pivoted, thereby permitting complete machining operations on the workpiece.

The present invention further relates to a machine tool for machining, in particular for turning and milling, a workpiece having a central rotation axis, said machine tool comprising a tool holder for holding a tool, a work rest for seating the workpiece, a work mounting for holding the workpiece in place, and a drive means for rotating the workpiece about the rotation axis, wherein the work rest has a bore for accommodating a workpiece arbor provided on a first side of the workpiece, such that a section of the workpiece arbor projects into the bore, and wherein the work mounting has a counter-holder movable in the direction of the rotation axis for applying a contact pressure, acting in the direction of the rotation axis, to the workpiece on a second side opposite the first side.

Even further, the present invention relates to a corresponding method for machining, in particular for turning and milling, a workpiece having a central rotation axis, said method comprising the steps of holding the tool by a tool holder, placing the workpiece on a work rest, holding the workpiece in place by a work mounting, and rotating the workpiece about the rotation axis by a drive means, wherein the workpiece, with a workpiece arbor arranged on a first side, is inserted into a bore provided in the work rest, such that a section of the workpiece arbor projects into the bore, and wherein a contact pressure acting in the direction of the rotation axis is applied to the workpiece in the direction of the rotation axis on a second side opposite the first side in order to hold the workpiece in place.

In this machine tool, the operating principle between the workpiece bore provided on one side of the workpiece and the arbor provided on the opposite side of the work mounting is in principle reversed, with otherwise the same mode of operation. Depending on the configuration of the workpiece (with bore or arbor), the appropriate machine tool is used for machining said workpiece. It goes without saying that the advantageous configuration described above accordingly also apply in the same or similar manner to this machine tool and this method.

Further advantages follow from the description and the attached drawing.

It goes without saying that the abovementioned features and the features still to be explained below can be used not only in the respectively specified combination but rather also in other combinations or on their own without departing from the scope of the present invention.

BRIEF DESCRIPTION OF THE DRAWINGS

The invention is explained in more detail below with reference to exemplary embodiments shown in the drawings, in which.

DESCRIPTION OF A PREFERRED EMBODIMENT

Figure 1:
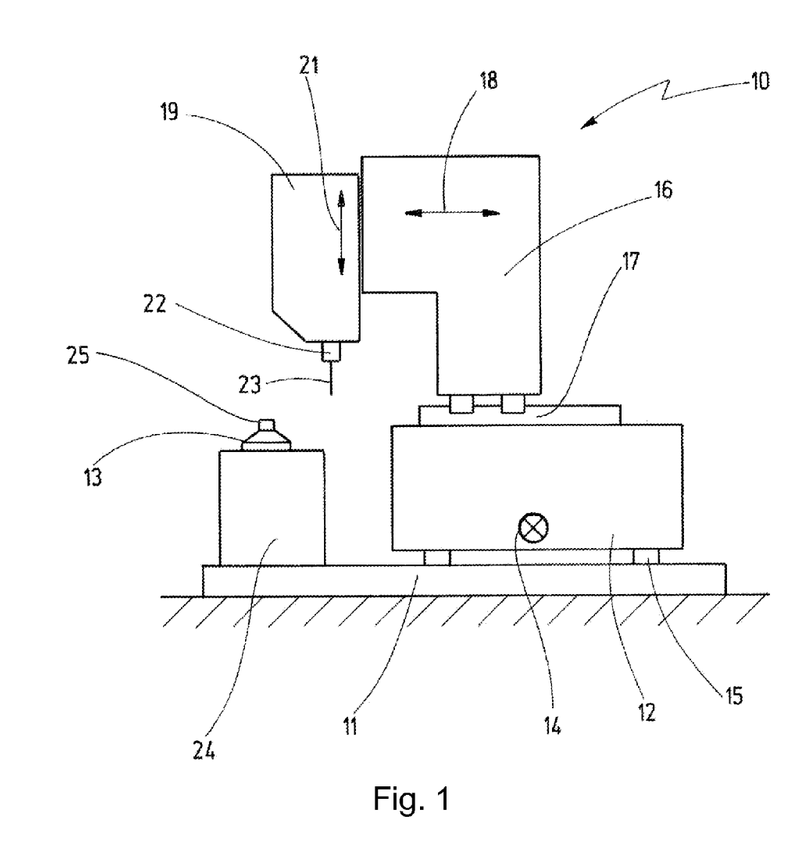
FIG. 1 shows a diagrammatic sketch of a machine tool according to the invention in a schematic side view.

Designated by 10 in FIG. 1 is a machine tool which is shown in a schematic illustration that is not true to scale and is not detailed.

On its machine base 11, the machine tool 10 has a first slide 12 which is traversable on guide rails 15 in the direction of a first axis 14. A second slide 16 is arranged on the first slide 12 such as to be traversable via guide rails 17 in the direction of a second axis 18.

A spindle head 19 is mounted on the second slide 16 such as to be traversable in the direction of a third axis 21. Rotatably mounted in the spindle head 19 is a work spindle 22 which carries a tool 23 at its bottom end.

A work table 24 which carries a work rest 13 is also provided on the machine base 11. Sitting on this work rest 13 is the workpiece 25 (only indicated schematically), which is machined with the tool 23 at different points by the traversing of the spindle head 19 and thus of the work spindle 18 in the three axes 14, 18, 21.

Further details and the basic functioning of such a machine tool are generally known to the person skilled in the art and are therefore not to be explained in more detail at this point.

Figure 2:
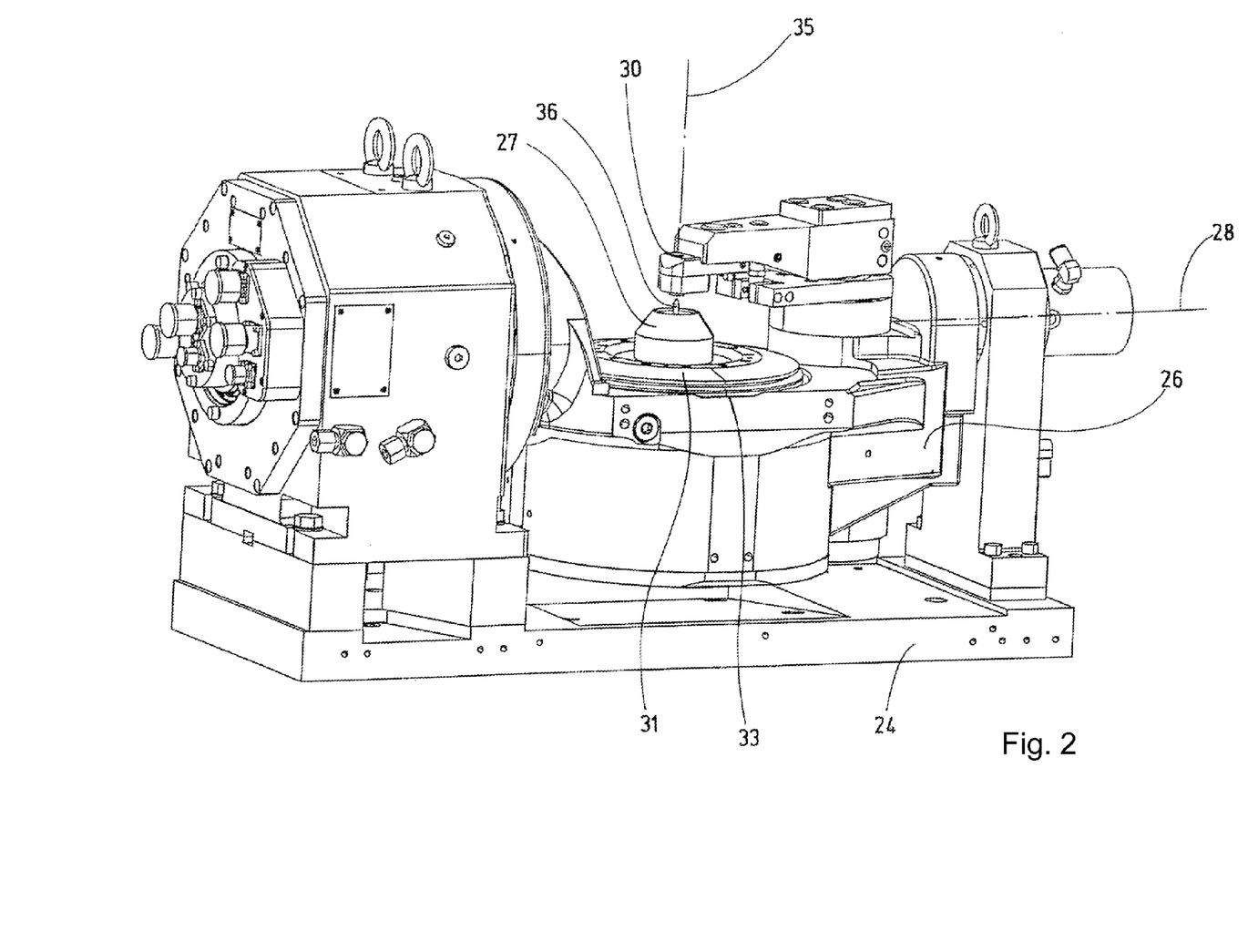
FIG. 2 shows an oblique view of the fixture of a first configuration of a machine tool according to the invention.

A first actual configuration of a machine tool according to the invention is shown in FIG. 2, wherein only the parts of the machine tool according to the invention that belong to the "fixture" are explicitly shown. In particular, all the components (that is to say in particular work spindle 22, spindle head 19, second slide 16 and first slide 12) concerning the tool mounting are not shown. The same components are otherwise designated with the same reference numerals as in FIG. 1.

The work table 24 with a rotatable work plate 31, on which a work locator 27 sits which can be exchanged for adapting to various workpieces, can be seen in FIG. 2. In this configuration, the work plate 31 and the work locator 27 together form the work rest 13. In principle, however, it is also possible to put the workpiece (without work locator 27) directly onto the work plate 31.

The work piece (not shown in FIG. 2), for example a workpiece blank having a premachined outer contour for producing a turbocharger compressor impeller, rests on the work locator 27. A centering arbor 36 which serves to center the workpiece projects through the work locator 27. Furthermore, a counter-holder 30 can be seen which can be put onto the workpiece from above and with which a contact pressure can be applied to the workpiece from above for holding the workpiece in place during the machining. The workpiece together with work locator 27 and work plate 31 can be centered about a vertical rotation axis 35, which corresponds to the central axis of rotation 255 (cf. FIG. 5) of the workpiece, by means of a drive device 33 arranged in the work table 24. The drive device 33 may be, for example, a torque motor. Furthermore, the "cradle" 26, on which the drive device 33, the work plate 31 and the work locator 27 sit, is pivotable about a transverse axis 28.

Figure 3:
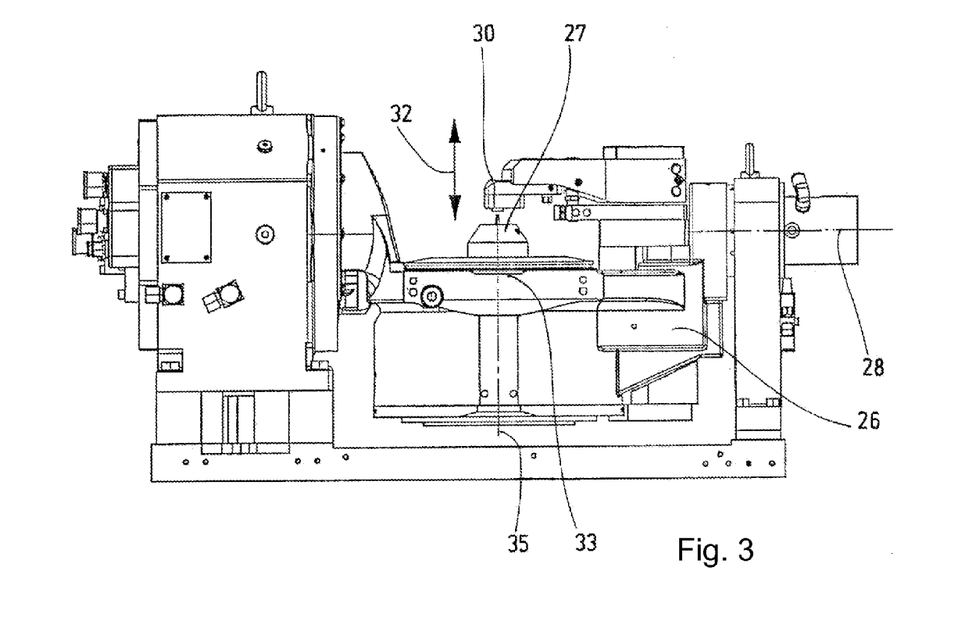
FIG. 3 shows a side view of the fixture of the machine tool shown in FIG. 2.
Figure 4:
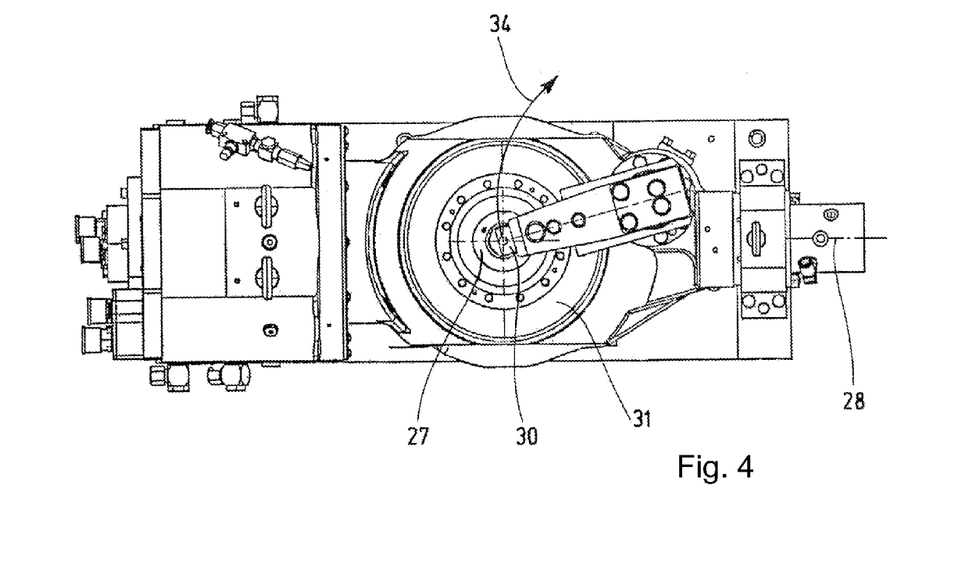
FIG. 4 shows a plan view of the fixture of the machine tool shown in FIG. 2.

As can be seen from the side view, shown in FIG. 3, and from the plan view, shown in FIG. 4, of the fixture of this configuration of the machine tool according to the invention, the counter-holder 30 is both movable in the vertical direction 32 and pivotable (arrow 34) in a plane lying perpendicularly to the vertical direction 32 so that workpieces can be loaded into and unloaded from the machine tool from above.

Figure 5:
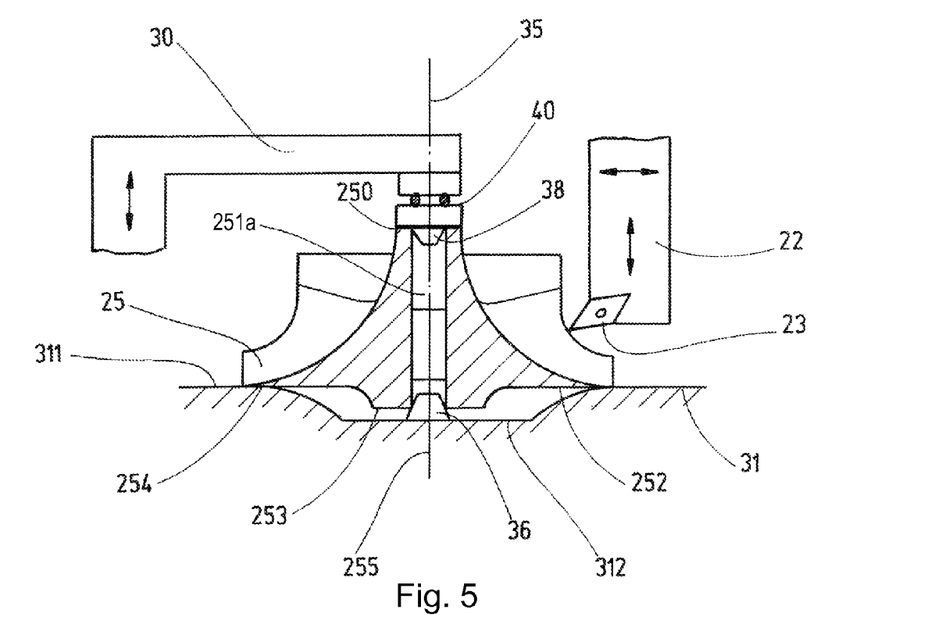
FIG. 5 shows an enlarged illustration of a workpiece clamped in place in the first configuration of a machine tool according to the invention.

More details of the precise setup of the workpiece 25 in an actual configuration of the machine tool according to the invention can be seen from FIG. 5. Shown there is a cross section through a workpiece 25 (here a turbocharger compressor impeller) during the machining by a tool 23. The workpiece 25 has a centrally running through-bore 251a. Engaging in this bore 251a from below is an arbor 36, in the present case a tapered arbor, which is fixedly arranged centrally on the top side 311 of the work plate 31. This tapered arbor 36 has an oversize relative to the bore 251a, such that only the top part of the tapered arbor 36 projects into the bore 251a, whereas the bottom part protrudes. Since the workpiece 25 on the underside 252 in the central region 253 around the bore 251a projects relative to the remaining area of the underside 252, the top side 311 of the work plate 31 has a recess in this central region 312. Furthermore, the top side 311, serving as work rest, of the work plate 31 is configured in such a way that the workpiece 25 in this configuration rests only in its marginal region 254 with the underside 252 on the work table 31, but not in all regions of the underside 252 lying further on the inside. Precise defined seating of the workpiece 25, in which the frictional clamping against rotation by the machining forces is optimal, is achieved by this configuration. Overall, this configuration achieves the effect that the workpiece 25 can be inserted with high precision centrally into the machine tool, such that the central bore axis 255, which runs vertically in this case, thus corresponds exactly to the rotation axis 35 about which the workpiece 25 is rotated during the machining.

To hold the workpiece 25 in place, the gripping arm 30 is located in the position which is shown in FIG. 5 and in which it applies a contact pressure to the workpiece 25 from above as precisely as possible in the direction of the bore axis 255. To this end, in the configuration shown, another tapered arbor 38 is arranged on the underside of the front end of the counter-holder 30, and this tapered arbor 38 is connected to the counter-holder 30 via a mount 40 which permits a rotation of the tapered arbor 38 relative to the counter-holder 30. In this case, this tapered arbor 38 is configured in such a way that the bottom margin thereof projects into the bore 251a from above.

In this case, the tapered arbor 38 is configured, in a similar manner to the tapered arbor 36, with a slight oversize (e.g., only a few μm, for example 2-10 μm), such that the tapered arbor 38 in this configuration does not project into the bore 251a over its full length. Alternatively, however, provision may be made for the tapered arbor 38 to be configured in such a way that it projects completely (over its full length) into the bore 251a in an accurately fitting manner, such that, via the underside of the mount 40, said underside resting on the top side 250 of the workpiece 25, the contact pressure is applied at least partly to the workpiece 25 from above by the counterholder 30. In both configurations, however, the tapered arbor 38 engaging exactly centrally in the bore 251a likewise helps to center the workpiece 25.

Figure 6:
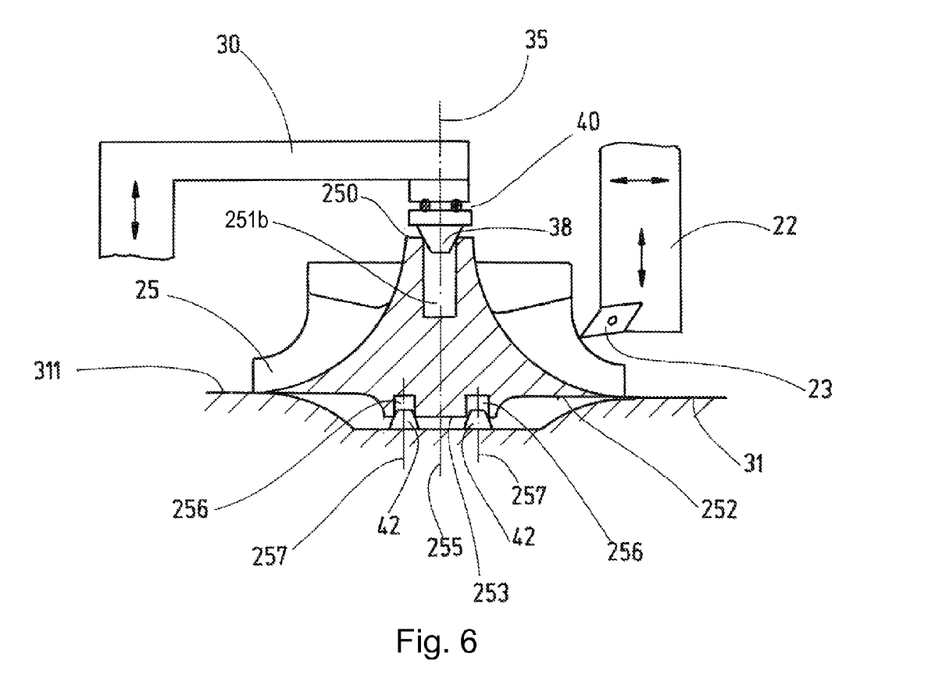
FIG. 6 shows an enlarged illustration of a workpiece clamped in place in a second configuration of a machine tool according to the invention.

A cross section through the workpiece 25, as set up for machining in a second configuration of the machine tool according to the invention, is shown in FIG. 6. Unlike the workpiece shown in FIG. 5, the workpiece 25 here does not have a central through-bore but rather a central blind hole 251b in the top region pointing toward the counter-holder 30. Furthermore, a plurality of bores 256 are arranged on the underside 252 in the central region 253, preferably in a uniformly distributed manner, around and at uniform distances from the central bore axis 255.

As in the configuration shown in FIG. 5, a truncated cone 38 engages in the bore 251b from above, the truncated cone 38 in the configuration shown in FIG. 6 having an oversize relative to the inside diameter of the bore 251b and therefore not projecting completely into the latter. For engagement in the bores 256, corresponding tapered arbors 42 are provided on the top side 311 of the work plate 31, said tapered arbors 42 being arranged concentrically to the respectively corresponding bore 256, that is to say centrally about the corresponding bore axis 257, and projecting partly into the corresponding bore 256. In this case, the number of tapered arbors 42 corresponds to the number of bores 256, at least two, preferably at least three, tapered arbors being provided.

Figure 7:
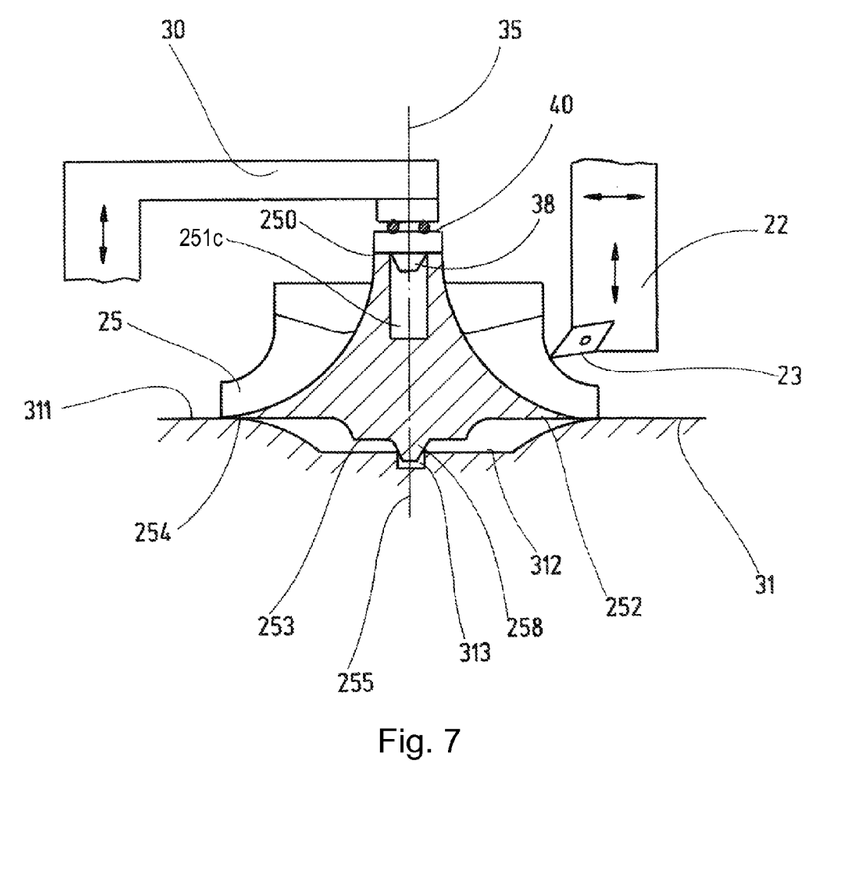
FIG. 7 shows an enlarged illustration of a workpiece clamped in place in a third configuration of a machine tool according to the invention.

A cross section through the workpiece 25, as set up for machining in a third configuration of the machine tool according to the invention, is shown in FIG. 7. Unlike the workpiece shown in FIG. 5, the workpiece 25 here does not have a central through-bore but rather, like the workpiece in FIG. 6, a central blind hole 251c in the top region pointing toward the counter-holder 30. Furthermore, a projecting arbor 258 is provided on the underside 252 in the central region 253 centrally relative to the rotation axis 35, and this arbor 258 engages in a corresponding central bore 313 provided in the work plate 31 and thus effects the central positioning of the workpiece 25. The same principle can of course also be applied for the positioning and clamping of the workpiece in the region of the counter-holder 30 as well as in the configuration of the workpiece 25 shown in FIG. 6.

The invention is not restricted to the configurations shown. In particular, the number, arrangement and configuration of the arbors can vary depending on the configuration of the workpiece to be machined. For example, a plurality of bores can also be provided on the top side of the workpiece, for the engagement of which correspondingly arranged and configured arbors can then be provided on the underside of the counter-holder. Furthermore, the invention is not restricted to the machining of a workpiece shown in the figures, in particular a turbocharger compressor impeller, but can generally preferably be used for machining workpieces which run at a high rotational speed during operation and therefore have to be produced in a highly precise manner in order to avoid unbalance as far as possible so that subsequent re-balancing can be dispensed with.

Therefore, what is claimed, is:

1. A machine tool for machining a workpiece having a first end, an opposing second end, and a central axis, wherein a face of the workpiece at said first end is transverse to said central axis, said machine tool comprising:
    a tool holder for holding a tool;
    a work table device, the work table device including:
        a cradle that is pivotably supported, at two opposite ends thereof that are spaced along a cradle pivot axis, for being pivoted about the cradle pivot axis, the cradle having the following mounted thereto to be pivoted about the cradle pivot axis:
            a work support for engaging and supporting the workpiece on said first end;
            a work mounting for engaging the workpiece on said second end; and
            a drive means for rotating the workpiece and work support about a rotational axis of the machine tool that is transverse with respect to the cradle pivot axis;
    wherein said work support comprises a work rest surface perpendicular to said rotational axis and a central region centered about said rotational axis, which central region is recessed relative to said work rest surface such that said work rest surface surrounds said recessed central region and is configured to support the workpiece on said first end about a marginal region radially spaced from said central axis when said central axis is aligned with said rotational axis;
    wherein the work support further comprises first means arranged in said recessed central region for aligning the central axis of the workpiece with the rotational axis of the machine tool, which first means engage the first end of the workpiece; and
    wherein the work mounting further comprises a counter-holder movable in the direction of the rotational axis for applying a contact pressure, acting in the direction of the rotational axis, onto the second end of the workpiece, which counter-holder is mounted to the cradle so as to be pivotable relative to the cradle about an axis that is transverse with respect to the cradle pivot axis between a position wherein the workpiece can be loaded to and unloaded from the work support, and a position wherein the counter-holder applies the contact pressure.

2. The machine tool of claim 1, wherein the work rest surface is configured in such a way that, when the contact pressure is applied to the workpiece by the counter-holder, the first end of the workpiece rests against said work rest surface.

3. The machine tool of claim 2, wherein said work mounting further comprises second means on said second end of the workpiece for engaging the second end of the workpiece and aligning the central axis of the workpiece with said rotational axis.

4. The machine tool of claim 2, wherein the workpiece has a central bore extending along said central axis from said first end to said second end, and said first means comprises a first arbor extending along said rotational axis that is configured to project into said central bore on said first side of the workpiece to align said central axis with said rotational axis.

5. The machine tool of claim 4, wherein said first end of the workpiece between said marginal region and said central bore is unsupported by said work support.

6. The machine tool of claim 4, wherein said first arbor projects from said recessed central region of said work support, and further wherein said work rest surface surrounds said first arbor.

7. The machine tool of claim 6, wherein said central bore of the workpiece has a predetermined diameter and said first arbor is tapered and has at least one section that is oversized relative to the diameter of said central bore.

8. The machine of claim 7, wherein the counter-holder has a second arbor that is tapered and configured to project into the central bore of the workpiece on said second end, and further has at least one section that is oversized relative to the diameter of said central bore.

9. The machine tool of claim 1, wherein the pivot axis about which the counter-holder pivots relative to the cradle is parallel to the rotational axis.

10. The machine tool of claim 1, wherein the tool is a milling tool.

11. A machine tool for machining a workpiece having a first end, an opposing second end, and a central bore that extends along a central bore axis from the first end to the second end, wherein the central bore axis is transverse to faces of the workpiece that are located at the first end and the second end, respectively, said machine tool comprising:
- a tool holder for holding a tool;
- a work table device, the work table device including:
  - a cradle that is pivotably supported, at two opposite ends thereof that are spaced along a cradle pivot axis, for being pivoted about the cradle pivot axis, the cradle having the following mounted thereto to be pivoted about the cradle pivot axis:
    - a work support;
    - a work mounting; and
    - a drive means for rotating the work support about a rotational axis of the machine tool that is transverse with respect to the cradle pivot axis;
- wherein the work support comprises a central region centered about said rotational axis and a work rest surface that surrounds the central region and is configured to support the workpiece on the first end at a marginal region of the workpiece;
- wherein the work support further comprises an arbor centered about said rotational axis, which arbor protrudes from the central region of the work support, such that a section of the arbor projects into the central bore on the first end of the workpiece to align the central bore axis with said rotational axis when the workpiece is attached to the arbor;
- wherein the work mounting has a counter-holder movable in the direction of the rotational axis for applying a contact pressure, acting in the direction of the rotational axis, onto the second end of the workpiece, such that the workpiece rotates with said work support, and which counter-holder is mounted to the cradle so as to be pivotable relative to the cradle about an axis that is transverse with respect to the cradle pivot axis between a position wherein the workpiece can be loaded to and unloaded from the work support, and a position wherein the counter-holder applies the contact pressure; and
- wherein the central region is recessed relative to the work rest surface of the work support such that, in the state in which the workpiece is attached to the arbor and contact pressure is applied to the workpiece by the counter-holder, the first end of the workpiece rests only against the arbor and the work rest surface of the work support.

12. The machine tool of claim 11, wherein the work rest surface is spaced from said arbor in a radial direction with respect to said rotational axis.

13. The machine tool of claim 12, wherein said first end of the workpiece between said marginal region and said central bore is unsupported by said work support.

14. The machine tool of claim 13, wherein said central bore of the workpiece has a predetermined diameter and said arbor is tapered and has at least one section that is oversized relative to the diameter of said central bore.

15. The machine tool of claim 14, wherein the arbor of the work support is a first arbor, and wherein the counter-holder has a second arbor that is tapered and configured to project into the central bore of the workpiece on said second end of the workpiece and has at least one section that is oversized relative to the diameter of said central bore.

16. A machine tool for machining a workpiece having a first end, an opposing second end, and a central axis, wherein a face of the workpiece at said first end is transverse to said central axis, said machine tool comprising:
- a tool holder for holding a tool;
- a work table device, the work table device including:
  - a cradle that is pivotably supported, at two opposite ends thereof that are spaced along a cradle pivot axis, for being pivoted about the cradle pivot axis, the cradle having the following mounted thereto to be pivoted about the cradle pivot axis:
    - a work support for engaging and supporting the workpiece on said first end;
    - a work mounting for engaging the workpiece on said second end; and
    - a drive means for rotating the workpiece and work support about a rotational axis of the machine tool that is transverse with respect to the cradle pivot axis;
- wherein said work support comprises an arbor and a work rest surface, which work rest surface is transverse to the rotational axis, wherein said arbor extends along said rotational axis and is configured to engage the workpiece on the first end and to center the central axis of the workpiece relative to said rotational axis, and further wherein said arbor projects from a central region of said work support that is recessed relative to said work rest surface, such that said work rest surface is spaced radially outward from said arbor with respect to the rotational axis, and the work rest surface supports the workpiece in a marginal region of said first end, which marginal region is radially spaced from said central axis; and
- the work mounting having a counter-holder movable along the rotational axis and configured to apply a contact pressure, acting along the rotational axis, onto the second end of the workpiece, which counter-holder is mounted to the cradle so as to be pivotable relative to the cradle about an axis that is transverse with respect to the cradle pivot axis between a position wherein the workpiece can be loaded to and unloaded from the work support, and a position where the counter-holder applies the contact pressure;
- wherein the machine tool is configured to clamp the workpiece by contacting it only at the work rest surface, the arbor and the counter-holder.

17. The machine tool of claim 16, wherein the arbor projects into a central bore of the workpiece that extends along the central axis.

18. The machine tool of claim 17, wherein said work mounting further comprises a second arbor configured to project into the central bore of the workpiece on the second end.

19. The machine tool of claim 17, wherein said first end of the workpiece between said marginal region and said central bore is unsupported by said work support.

20. A machine tool for machining a workpiece having a first end, an opposing second end, and a central axis, wherein a face of the workpiece at said first end is transverse to said central axis, said machine tool comprising:
- a tool holder for holding a tool;
- a work table device, the work table device including:
  - a cradle that is pivotably supported, at two opposite ends thereof that are spaced along a cradle pivot axis, for being pivoted about the cradle pivot axis, the cradle having the following mounted thereto to be pivoted about the cradle pivot axis:
a work support for engaging and supporting the workpiece on said first end;
a work mounting for engaging the workpiece on said second end; and
a drive means for rotating the workpiece and work support about a rotational axis of the machine tool that is transverse with respect to the cradle pivot axis;
wherein the work mounting further comprises a counter-holder movable in the direction of the rotational axis for applying a contact pressure, acting in the direction of the rotational axis, onto the second end of the workpiece, which counter-holder is mounted to the cradle so as to be pivotable relative to the cradle about an axis that is transverse with respect to the cradle pivot axis between a position wherein the workpiece can be loaded to and unloaded from the work support, and a position wherein the counter-holder applies the contact pressure.

* * * * *